June 5, 1956 W. E. SCHAEFER ET AL 2,749,323
ACCELERATION OF THE VULCANIZATION OF BUTYL RUBBER WITH DIMETHYLOL PHENOLS AND PRODUCT OBTAINED THEREBY
Filed Jan. 26, 1953
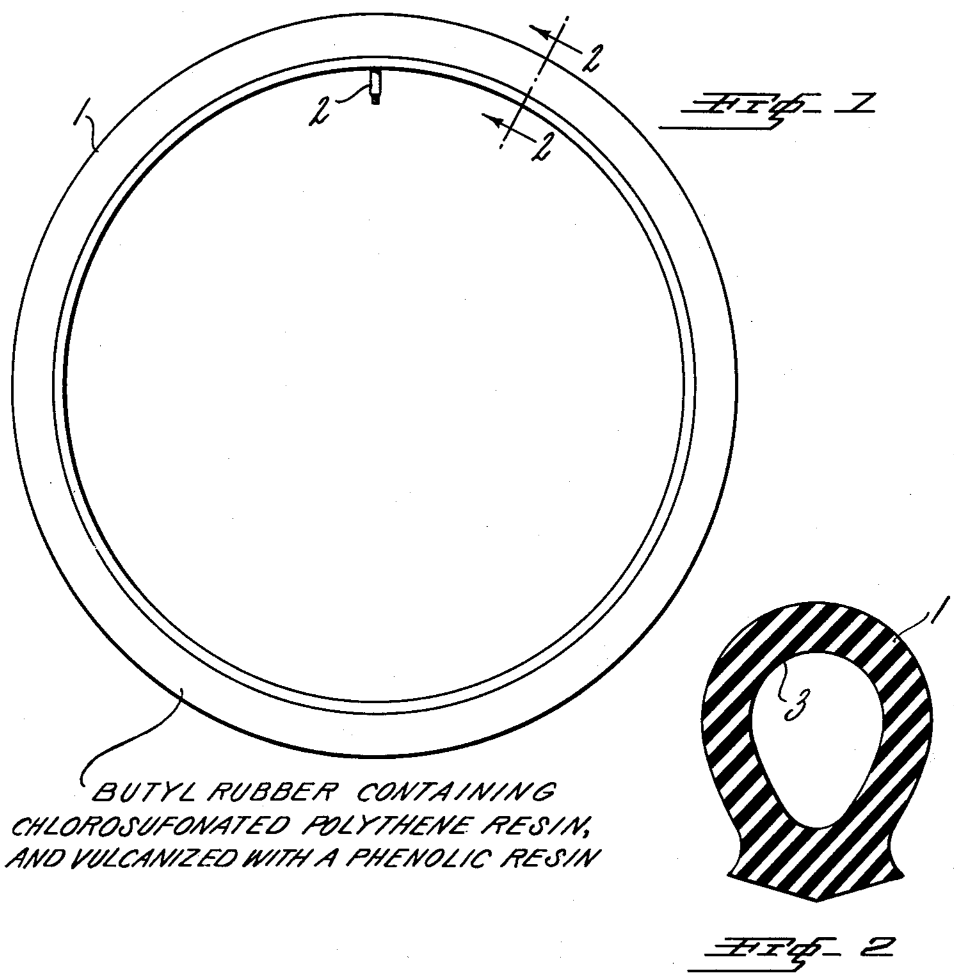
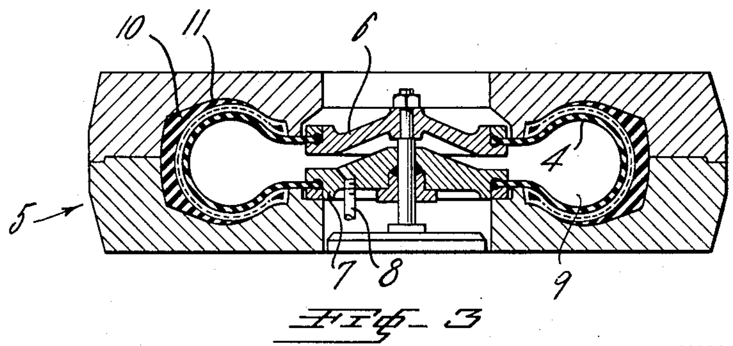
INVENTORS
WILLIAM E. SCHAEFER
HARVEY J. BATTS
DONALD A. BRAFFORD
BY James J. Long
AGENT United States Patent Office 2,749,323

Patented June 5, 1956

2,749,323

ACCELERATION OF THE VULCANIZATION OF BUTYL RUBBER WITH DIMETHYLOL PHENOLS AND PRODUCT OBTAINED THEREBY

William E. Schaefer, Harvey J. Batts, and Donald A. Brafford, Indianapolis, Ind., assignors to United States Rubber Company, New York, N. Y., a corporation of New Jersey Application January 26, 1953, Serial No. 333,052

6 Claims. (Cl. 260—43)

This invention relates to a process for vulcanizing Butyl rubber, and more particularly it relates to a process for accelerating the vulcanization of Butyl rubber with dimethylol phenols, as well as to vulcanized products obtained thereby, especially curing bags.

This application is a continuation-in-part of our copending application Serial No. 270,356, now abandoned, filed February 7, 1952.

A copending application of Tawney and Little, Serial No. 266,146, Patent No. 2,701,895, filed January 12, 1952, discloses and claims the vulcanization of Butyl rubber with dimethylol phenols. It has been desired to render the vulcanization of Butyl rubber with dimethylol phenols more convenient and more economical, by reducing the time and temperature necessary to attain a practical cure by this method. Accordingly, the principal object of the present invention is to provide a method of accelerating the aforesaid vulcanization process.

Another object of the invention is to provide improved vulcanizates based upon Butyl rubber vulcanized with dimethylol phenols, particularly curing bags, having enhanced resistance to deterioration after prolonged use. In the manufacture of pneumatic tires it is customary to employ an inflatable annular toroidal form, usually made of vulcanized rubber, and known as a curing bag or water bag. The curing bag is disposed within the raw tire casing as an aid in shaping the tire, and also for the purpose of applying internal heat and pressure to the tire casing in the molding press in which the tire is vulcanized. For this purpose the bag is inflated with a fluid heating medium, usually hot water, steam, or air, under pressure, which causes the bag to expand and thereby forces the tire casing into close conformity with the vulcanizing mold. Upon completion of the vulcanization, the curing bag is removed from the tire, and inserted in another raw tire for a repetition of the curing operation. The bag is thus repeatedly reused for a number if cycles or turns.

The curing bag is subjected in use to a number of highly deleterious influences which place a definite limitation on the number of times the bag can be reused. Thus, each time a tire is vulcanized the bag is heated for prolonged periods to vulcanizing temperatures, with the result that the rubbery material from which the bag is made tends to become over-vulcanized. This condition is aggravated by the fact that the sulfur contained in the raw tire stock in contact with the curing bag surface tends to migrate or diffuse into the bag material, and such migrated sulfur further vulcanizes the curing bag, to the extreme detriment of its physical properties. Also, the bag material is subject to oxidative attack, as well as reversion, with resulting loss of elasticity and strength. The combination of these deleterious surface conditions generally results in a rough or cracked exterior surface which is directly transferred to the interior of the tire. This leaves the inner tube surface undesirably rough so as to aggravate tube chafing later in service. The deterioration of the bag material advances with each successive cycle of use, until finally the bag is no longer fit for use and must be discarded.

In addition to the foregoing deleterious chemical influences, the bag is also subjected to considerable mechanical abuse, because it is severely twisted and rammed each time it is inserted in a raw tire casing, and it is roughly pulled and distorted each time it is removed from a finished tire. Sometimes the weakened bag material will develop a hole or crack during these operations, and if the failure is not discovered in time a defective tire will be produced. Even the smallest leak in the curing bag can lead to an improperly cured tire.

The resulting necessity for discarding the curing bag after it has been used a number of times represents an appreciable expense in the manufacture of tires, and those skilled in the art have consequently devoted much effort to improving the curing bag so as to render it capable of giving better and longer service.

The invention is based on the unexpected discovery that if a relatively small amount of rubbery chlorosulfonated polythene, is present in the vulcanizable mix of Butyl rubber and dimethylol phenol, the curing process is remarkably accelerated, and excellent cures are obtained in a considerably shorter time, or at lower temperature, than would otherwise be possible.

Several forms of curing bag made in accordance with the invention are illustrated in the accompanying drawing, wherein:

Fig. 1 is a side elevational view of a bicycle tire curing bag;

Fig. 2 is a sectional view of the bag, taken along line 2—2 of Fig. 1; and

Fig. 3 is a transverse sectional elevational view of a curing bag or blanket of the kind that is mounted integrally in a vulcanizing press, shown in position in the press with a pneumatic tire casing.

In Fig. 1, the bag 1 has an external form corresponding essentially to the internal contour of the bicycle tire to be vulcanized thereon, and it is equipped with one or more inlet stems or valves 2 which serve for the introduction of hot water or other fluid to the interior cavity 3 of the bag during the vulcanizing operation.

The material of the bag is an extensible, resilient composition composed largely of Butyl rubber, which is a commercially available type of synthetic rubber. Butyl rubber, as is well known, is the type of synthetic rubber made by copolymerizing an isoolefin, usually isobutylene, with a minor proportion of a multi-olefinic unsaturate having from 4 to 14 carbon atoms per molecule. The isoolefins used generally have from 4 to 7 carbon atoms, and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 1,2-dimethyl butadiene-1,3; 1,3-dimethyl butadiene-1,3; 1-ethyl ethyl butadiene-1,3; and 1,4-dimethyl butadiene-1,3. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubber.

In accordance with the invention, the Butyl rubber is compounded for vulcanization with a dimethylol phenol as the curing agent, using chlorosulfonated polythene rubber as the accelerator. The dimethylol phenol curing agents are known materials. The dimethylol phenol employed may be essentially a monomeric material, or it may be a polymeric material formed by self-condensation of the dimethylol phenol to yield a heat-reactive, oil-soluble, resinous product. Such resinous polymeric dimethylol phenols are the preferred materials for use in manufacturing the puncture-sealant from Butyl rubber in accordance with the method of the invention. Mixtures of the resinous polymeric dimethylol phenols with more or less of low molecular weight or monomeric dimethylol phenols are also useful. For convenience, the term dimethylol phenol will be used to refer to any of the monomeric or polymeric compounds, or to mixtures thereof, unless otherwise stated.

As will be understood by those skilled in the art, the dimethylol phenols are typically made by reacting a para-substituted phenol having the two ortho positions unoccupied, with a considerable molar excess of formaldehyde, the molar ratio of formaldehyde to phenol typically being 2:1, in the presence of a strong alkaline catalyst, especially an alkali metal hydroxide, which is subsequently neutralized. Typically the mixture of the phenol, formaldehyde and alkaline catalyst is heated at a suitable temperature, e. g., 25–100° C., the first stage of the reaction involving formation of the phenol methylol, i. e., the para-substituted-2,6-dimethylol phenol. This material, which is a phenol dialcohol, can be isolated by acidification of the mixture and separation of the oily layer which can then be advanced to higher molecular weight form by heating at say 75–175° C. This higher molecular weight form is oil-soluble and heat-reactive, and has the advantages that it is more reactive with the Butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case, care should be taken to stop while the resin is in the soluble (in conventional organic solvents and drying oils) and fusible state. This is the resol type of resin.

The phenol from which the dimethylol phenol is made generally has a hydrocarbon group in the position para to the phenolic hydroxyl, examples being alkyl groups, especially alkyl groups having from 3 to 20 carbon atoms, tertiary-butyl and tertiary-octyl (alpha, alpha, gamma, gamma-tetramethyl butyl) being especially preferred, cycloalkyl groups, aryl groups such as phenyl, and aralkyl groups such as benzyl and cumyl. We believe that the tertiary-butyl and the aforementioned branched octyl are outstanding. Examples of suitable dimethylol phenols that may be used in the invention either in the polymeric or monomeric form are as follows:

2,6-dimethylol-4-methyl phenol
2,6-dimethylol-4-tertiary-butyl phenol
2,6-dimethylol-4-octyl phenol
2,6-dimethylol-4-dodecyl phenol
2,6-dimethylol-4-phenyl phenol
2,6-dimethylol-4-benzyl phenol
2,6-dimethylol-4-(alpha, alpha-dimethyl benzyl) phenol
2,6-dimethylol-4-cyclohexyl phenol The resinous forms of these materials, prepared as described, are preferred.

The dimethylol phenol is preferably employed in amount within the range of from about 4 to 15 parts by weight to 100 parts of the Butyl rubber. While smaller amounts of the dimethylol phenol may be used, e. g., 3 parts, it is usually found that less than this amount is insufficient to produce a practical cure within a reasonable time. However if a full cure is not desired, very small amounts may be used, as will be more fully explained below. Also, larger amounts may be used, e. g., 20 parts, but amounts greater than this are without further advantage.

The rubbery chlorosulfonated polythene used as accelerator is also a commercially available elastomer, marketed under the trade name Hypalon S–2. Usually from about 2 to 10 parts by weight of the chlorosulfonated polythene are admixed with 100 parts of the Butyl.

For purposes of making a curing bag, there is generally included in the mixture a quantity of a suitable reinforcing material, preferably carbon black. Although from at least about 20 to 100 parts by weight of carbon black may be employed per 100 parts of the Butyl rubber, it is generally preferred to use from about 40 to 80 parts of black, and most preferably about 50 or 60 parts. Other compounding ingredients, such as fillers, processing aids, etc., may be included in the mixture desired.

The Butyl rubber and additional ingredients may be mixed together in any desired order according to the procedure ordinarily used in mixing rubber compounds, with the aid of the usual rubber mixing equipment such as a Banbury mixer or roll mills.

The vulcanizable mixture resulting from the foregoing ingredients may be fabricated into the desired form by the usual methods, such as calendering, extrusion, or molding, and subsequently vulcanized by heating, preferably while confined under pressure. Curing bags are usually made by conventional extrusion and splicing operations, after which the bag is vulcanized by heating in a suitable mold.

The vulcanization process of the invention is conveniently carried out at temperatures in excess of 200° F., and preferably at temperatures in excess of 300° F., for periods of time ranging from about 1/4 to 3 hours, the longer periods of time within the stated time range being employed with the lower temperatures. The most preferred vulcanizing temperatures are within the range of about 320° to 370° F., although somewhat higher temperatures may be employed, e. g., 390 or 400° F., provided such highly elevated temperatures are not maintained for a sufficiently long time to cause thermal injury to the article.

A specific example of a composition suitable for making the curing bag of the invention is as follows:

*Example I*

| | Parts by weight |
|---|---|
| GR–I 18 (a commercial grade of synthetic rubber made by copolymerizing isobutylene with isoprene, and containing about 2½% of combined isoprene) | 100.00 |
| Philblack "O" | 60.00 |
| Stearic acid | 1.00 |
| Amberol ST–137 (reactive phenolic resin) | 12.00 |
| Hypalon S–2 (chlorosulfonated polythene elastomer) | 5.00 |

Hypalon S–2 is a commercial elastomer composed of chlorosulfonated polythene. It is estimated to have a molecular weight of 30,000 and contains approximately 28% chlorine and 1.5% sulfur. These two elements are chemically combined with a hydrocarbon chain, with most of the chlorine substituted on the chain, and the sulfur is combined with chlorine and attached to the chain as sulfonyl chloride ($SO_2Cl$) groups. There is approximately one chlorine atom for every 6 or 7 carbon atoms, and one sulfonyl chloride for every 90 to 130 carbon atoms. Amberol ST–137 is a trade designation for a phenolic resin of the dimethylol phenol class, and it is believed to be made from about 1 mole of p-octyl phenol, 2 moles of formaldehyde and 1 mole of sodium hydroxide, the alkali being carefully neutralized after the condensation is complete. The composition of Example 1 was fabricated into a curing bag and vulcanized at 350° F. for ½ hour.

It was found that the resulting curing bag was far superior to conventional curing bags in its resistance to the deteriorating influences outlined above. Specifically, is was most unexpectedly observed in actual factory trial of a curing bag made in this manner that the improved curing bag had a useful service life at least several times as great as the life of a bag made from butyl rubber vulcanized with sulfur. Insofar as the present inventors are aware, there has never before been known to those skilled in the art any expedient capable of producing such a remarkable improvement in the life of a curing bag.

It was further observed that the chlorosulfonated polythene included in the formulation was in large measure responsible for the unexpected increase in bag life. This was demonstrated by preparing a similar curing bag from the following composition:

*Example II*

| | Parts by weight |
|---|---|
| GR-I | 100.00 |
| Philblack O | 60.00 |
| Stearic acid | 1.00 |
| Amberol ST-137 | 12.00 |
| Hypalon S-2 | — |

It will be noted that this composition is the same as the composition of the invention given in Example 1, except for the fact that it contains no chlorosulfonated polythene. The bag without the chlorosulfonated polythene did not produce the same result as the bag made in accordance with the invention, since it displayed only a fraction of the useful service life of the bag of the invention.

A further surprising advantage of including chlorosulfonated polythene in the Butyl rubber vulcanized with a dimethylol phenol lies in the fact that the chlorosulfonated polythene increases the rate of cure of the composition significantly, so that curing bags or other articles can be manufactured more conveniently and more economically. This is not only an entirely unexpected advantage in itself, but it is all the more unexpected that a substance which increases the rate of cure of the composition leads to a final vulcanizate characterized by exceptional resistance to over-cure, as evidenced by improved performance in service.

The following example will serve to illustrate the accelerating effect of the chlorosulfonated polythene on the cure:

*Example III*

| | Cure at 350° F. | III-A | III-B |
|---|---|---|---|
| GR-I 18 | | 100.00 | 100.00 |
| EPC Carbon Black | | 60.00 | 60.00 |
| Stearic Acid | | 1.00 | 1.00 |
| ST-137 Resin | | 12.00 | 12.00 |
| Hypalon S-2 | | ---------- | 5.00 |
| Tensile Strength, p. s. i. | 5′ | 645 | 730 |
| | 10′ | 770 | 1,830 |
| | 15′ | 1,760 | 2,230 |
| | 30′ | 2,560 | 2,180 |
| | 45′ | 2,710 | 2,480 |
| | 60′ | 2,800 | 2,560 |
| Percent Elongation at Break | 5′ | >1,100 | 1,000 |
| | 10′ | 580 | 680 |
| | 15′ | 680 | 600 |
| | 30′ | 630 | 490 |
| | 45′ | 560 | 460 |
| | 60′ | 510 | 440 |
| 300% Modulus, p. s. i. | 5′ | 105 | 220 |
| | 10′ | 215 | 635 |
| | 15′ | 540 | 1,020 |
| | 30′ | 960 | 1,280 |
| | 45′ | 1,250 | 1,420 |
| | 60′ | 1,450 | 1,720 |
| 500% Modulus | 5′ | 170 | 405 |
| | 10′ | 615 | 1,325 |
| | 15′ | 1,265 | 1,950 |
| | 30′ | 2,100 | |
| | 45′ | 2,540 | |
| | 60′ | 2,740 | |
| Hardness, Durometer, A Scale | 5′ | 53 | 62 |
| | 10′ | 46 | 65 |
| | 15′ | 57 | 67 |
| | 30′ | 61 | 72 |
| | 45′ | 64 | 74 |
| | 60′ | 65 | 74 |
| Hot Flow at 340° F., percent increase in strain when subjected to a stress of 50 p. s. i. for— | | | |
| 6 hrs | 15′ | 13.3 | 19 |
| | 30′ | 43 | 12 |
| 24 hrs | 15′ | 64 | 24 |
| | 30′ | 60 | 29 |
| 48 hrs | 15′ | ---------- | 38 |
| | 30′ | 71 | 29 |

It will be apparent, by inspection of the foregoing results, that the inclusion of 5 parts of chlorosulfonated polythene in the vulcanizate greatly accelerated the cure. The results of the hot flow test will reveal another important advantage of the invention, namely, the composition including the chlorosulfonated polythene did not flow as much under the influence of continued application of stress at elevated temperature. The hot flow of the composition is an important factor in determining the utility of a vulcanizate for service at high temperatures, as in curing bags.

The extraordinary improvement in the Butyl curing bag vulcanized with a dimethylol phenol and including chlorosulfonated polythene is all the more surprising when it is considered that the improvement is realized by the incorporation of such relatively small amounts of the chlorosulfonated polythene. Thus, as noted in the example above, 5 parts of chlorosulfonated polythene effected a profound improvement. Definite improvement is noted with as little as 1.0 parts of chlorosulfonated polythene, but it is in practice preferred to employ about at least 2 parts of chlorosulfonated polythene in the improved curing bag or other article. Larger amounts may be employed, but excessive amounts have a tendency to impart undesirable brittleness in the final cured mixture. In most instances, from 2 to 10 parts of chlorosulfonated polythene constitutes the preferred range.

The form of the invention shown in Fig. 3 constitutes a curing bag or blanket 4 of the type that is integrally mounted within a vulcanizing press 5, of the type described, for example, in the Soderquist Patent 2,296,800. Such a vulcanizing press is designed to receive the raw pneumatic tire in the form of a cylindrical band, as removed from the tire building drum, as distinguished from the type of vulcanizing press designed to receive a shaped and bagged raw tire. The press is capable of shaping the raw tire band as the press is closed. The inner edges of the bag 4 are integrally secured to upper and lower flange assemblies 6 and 7, which are adapted to be separated by a suitable mechanism (not shown) when the vulcanizing press is opened. A fluid supply passageway 8 extending through the lower flange assembly 7 serves to introduce fluid to the interior cavity 9 of the curing blanket 4, causing it to press the pneumatic tire casing 10 being vulcanized into close conformity with the surface of the mold cavity 11 within the press 5.

Like the form of the invention shown in Fig. 1, the type of curing bag illustrated in Fig. 3 also has remarkably improved service life when constructed according to the invention from the above-described compositions of Butyl rubber and chlorosulfonated polythene, vulcanized with dimethylol phenol. Similarly the invention may be employed to make re-tread curing bags, or sectional repair bags.

The improved vulcanizates of the invention can also be used to great advantage in making other articles, such as hose, belts, inner tubes, especially heavy service inner tubes, and pneumatic tires, especially tire treads and side walls, as well as other objects. The enhanced resistance of the improved vulcanizates to oxidation and aging and the effects of high temperature results in improved service and longer life in articles constituted of the present vulcanizates.

The process of the invention has been described with particular reference to the use of chlorosulfonated polythene to accelerate the dimethylol phenol cure of Butyl rubber wherein it was desired to substantially complete the cure of the Butyl rubber. However, it will be understood that the accelerating effect of the chlorosulfonated polythene on the dimethylol phenol cure of rubber can be taken advantage of also in processes where it is desired to effect only a limited or partial cure of the Butyl rubber by the dimethylol phenol. In such cases, the desired limited or partial reaction can be carried out in a shorter time, or at a lower temperature, by using the chlorosulfonated polythene as an accelerator in accordance with the invention. Thus, for example, the partial curing reaction between Butyl rubber and limited amounts of dimethylol phenol, for example, 0.2 to 2.5 parts per 100 parts of Butyl rubber, carried out at temperatures of 200°–400° F. for from 5–45 minutes, can be effectively accelerated by the presence of a small amount of chlorosulfonated polythene as described. Butyl rubber partially cured with dimethylol phenol and the process of making the same are disclosed in more detail and claimed in our co-pending application Serial No. 290,344, filed May 27, 1952, now Patent No. 2,702,287.

Having thus described our invention, what we claim and desire to protect by Letters Patent is:

1. A method of vulcanizing a synthetic rubbery copolymer of an iso-mono-olefin having from 4 to 7 carbon atoms with from 0.5 to 10 percent of an aliphatic conjugated diolefin having from 4 to 6 carbon atoms comprising the step of heating 100 parts of the said rubber in admixture with from 0.2 to 20 parts of a 2,6-dimethylol-4-hydrocarbon phenol as the curing agent, and from 1 to 10 parts of chlorosulfonated polyethylene as accelerator, at a temperature of 200°–400° F. for from 5 minutes to 3 hours.

2. A method of vulcanizing a synthetic rubbery copolymer of an iso-mono-olefin having from 4 to 7 carbon atoms with from 0.5 to 10 percent of an aliphatic conjugated diolefin having from 4 to 6 carbon atoms comprising the step of heating 100 parts of the said rubber in admixture with from 0.2 to 20 parts of a resinous 2,6-dimethylol-4-hydrocarbon phenol as the curing agent, and from 1 to 10 parts of chlorosulfonated polyethylene as accelerator, at a temperature of 200°–400° F. for from 5 minutes to 3 hours.

3. A method of vulcanizing a synthetic rubbery copolymer of an iso-mono-olefin having from 4 to 7 carbon atoms with from 0.5 to 10 percent of an aliphatic conjugated diolefin having from 4 to 6 carbon atoms comprising the step of heating 100 parts of the said rubber in admixture with from 0.2 to 20 parts of a resinous 2,6-dimethylol-4 lower alkyl phenol as the curing agent, and from 1 to 10 parts of chlorosulfonated polyethylene as accelerator, at a temperature of 200°–400° F. for from 5 minutes to 3 hours.

4. A method of vulcanizing a synthetic rubbery copolymer of an iso-mono-olefin having from 4 to 7 carbon atoms with from 0.5 to 10 percent of an aliphatic conjugated diolefin having from 4 to 6 carbon atoms comprising the step of heating 100 parts of the said rubber in admixture with from 0.2 to 20 parts of a resinous 2,6-dimethylol-4-octyl phenol as the curing agent, and from 1 to 10 parts of chlorosulfonated polyethylene as accelerator, at a temperature of 200°–400° F. for from 5 minutes to 3 hours.

5. A vulcanizate characterized by improved resistance to aging comprising 100 parts of a synthetic rubbery copolymer of an iso-mono-olefin having from 4 to 7 carbon atoms with from 0.5 to 10 percent of an aliphatic conjugated diolefin having from 4 to 6 carbon atoms vulcanized with from 3 to 15 parts of a resinous 2,6-dimethylol-4-hydrocarbon phenol and accelerated with from 1 to 10 parts of chlorosulfonated polyethylene.

6. A vulcanizate characterized by improved resistance to aging comprising 100 parts of a synthetic rubbery copolymer of an iso-mono-olefin having from 4 to 7 carbon atoms with from 0.5 to 10 percent of an aliphatic conjugated diolefin having from 4 to 6 carbon atoms vulcanized with from 3 to 15 parts of a resinous 2,6-dimethylol-4-lower alkyl phenol and accelerated with from 1 to 10 parts of chlorosulfonated polyethylene.

References Cited in the file of this patent

UNITED STATES PATENTS

| | | |
|---|---|---|
| 2,211,048 | Bitterich | Aug. 13, 1940 |
| 2,305,412 | Frolich | Dec. 15, 1942 |
| 2,429,397 | Compton et al. | Oct. 21, 1947 |
| 2,536,136 | Lucid | Jan. 2, 1951 |
| 2,649,431 | Little | Aug. 18, 1953 |

OTHER REFERENCES

Ser. No. 357,662, Wildschut (A. P. C.), published Apr. 20, 1943.

Rubber Age, January 1947, page 449.

Hypalon S–2, Bulletin No. X–35, 8 pp., Apr. 15, 1952, published by Du Pont Co., Wilmington, Del.